United States Patent [19]

Albert et al.

[11] Patent Number: 5,355,091
[45] Date of Patent: Oct. 11, 1994

[54] APPARATUS FOR REAL TIME INTERFERENCE SIGNAL REJECTION

[75] Inventors: Stuart D. Albert, Bricktown; William J. Skudera, Jr., Oceanport, both of N.J.

[73] Assignee: The United States of America as represented by the Secretary of the Army, Washington, D.C.

[21] Appl. No.: 886,203

[22] Filed: May 21, 1992

[51] Int. Cl.[5] ........................... H04B 1/10; G01S 7/36
[52] U.S. Cl. ..................... 328/167; 328/165; 307/520; 342/19
[58] Field of Search ............... 307/520, 358, 18; 328/16.7, 184, 165, 111; 342/19

[56] References Cited

U.S. PATENT DOCUMENTS

| | | | |
|---|---|---|---|
| 4,390,843 | 6/1983 | Betts et al. | 328/111 |
| 4,417,218 | 11/1983 | Berke | 328/184 |
| 4,544,926 | 10/1985 | Giuli | 542/19 |
| 4,965,581 | 10/1990 | Skudera, Jr. et al. | 328/165 |
| 5,126,681 | 6/1992 | Ziegler, Jr. et al. | 328/165 |
| 5,192,918 | 3/1993 | Sugiyama | 328/167 |

*Primary Examiner*—Timothy P. Callahan
*Assistant Examiner*—Dinh Le
*Attorney, Agent, or Firm*—Michael Zelenka; James A. Digiorgio

[57] ABSTRACT

Disclosed is a real time interference signal rejection circuit which utilizes a conventional chirp-Z analyzer to generate a critical number and stop a counter circuit. The critical number is then read by a microprocessor which calculates new tap values from a set of predetermined tap values to reprogram a programmable filter.

1 Claim, 1 Drawing Sheet

APPARATUS FOR REAL TIME INTERFERENCE SIGNAL REJECTION

GOVERNMENT INTEREST

The invention described herein may be manufactured, used, and licensed by or for the Government for governmental purposes without the payment to us of any royalty thereon.

BACKGROUND OF THE INVENTION

1. Field of the Invention

This invention relates to the field of analog signal processing and, more specifically, to circuitry that detects low-level frequency hopping signals in the presence of strong interference signals transmitting very close to the hopping signal's instantaneous frequency.

2. Description of the Related Art

The most widely used method of detecting a frequency hopping low level signal in an adverse environment is through a microprocessor controlled adaptive filter operating in an adaptive noise cancelling circuit. Such a method is disclosed in "Adaptive Noise Canceling: Principles and Application" by Bernard Widrow et al, Proceedings of the IEEE, Vol. 63, No. 12, Dec. 1975. FIG. 1 illustrates the basic concepts of this reference.

As shown in FIG. 1, a signal source S along with a noise source $n_o$ are fed into a modified adaptive noise canceler circuit 1. The noise canceler circuit partially consists of an adaptive filter 25, a power combinet 15 and a power splitter 10 which splits the incoming signal to the adaptive filter 25 and power combinet 15. The incoming signal split by power splitter 10 is then inputed to the adaptive filter 25 which rejects the desired low level signal and passes all other interference frequency components to power combiner 15. The power combinet 15 then combines this interference signal with the incoming signal and outputs only the desired low level signal. The microprocessor 20 compares this output with the expected output to decide if the adaptive filter tap weights need adjustment. To make an adjustment, the microprocessor 20 uses an algorithm that calculates new tap values, by an iteration process, and outputs them to the adaptive filter 25. Thus, the adaptive filter taps are constantly being updated for optimum performance in a dynamic environment. This process, however, has two deficiencies: (1) the microprocessor needs prior information regarding the desired high level signal in order to set the proper tap values, and (2) the algorithm method of calculating tap values is relatively slow, especially when a large number of taps are required to achieve the desired bandpass response.

A modification of this circuit described above is disclosed in U.S. Pat. No. 4,965,581 issued to the inventors herein on Oct. 23, 1990 and entitled "Real-Time Rejection Circuit to Automatically Reject Multiple Interfering Hopping Signals While Passing a Lower Level Desired Signal". This patent is incorporated herein by reference. This patent discloses the use of a chirp-Z analyzer capable of detecting frequency components over a wide bandwidth, with high resolution. In addition to the chirp-Z, the invention utilizes an inverse transform device and a gating circuit. These components, however, significantly reduce the invention's performance and efficiency. The inverse transform device reduces the sensitivity and dynamic range of the invention whereas the gate introduces spikes that cause distortion of the desired signal.

The present invention overcomes the problems described above.

SUMMARY OF THE INVENTION

Accordingly, it is an objective of this invention to provide a signal processing apparatus that enables communication intelligent systems (COMINT) to quickly detect low level frequency hopping signals that are transmitted in an adverse environment.

It is a further objective of the present invention to provide such an apparatus to expedite the aforementioned need for prior information.

It is a still further objective of this invention to provide a circuit for real-time interference rejection in the detection of low-level frequency hopping signals.

These and other objectives are attained by the present invention which contemplates utilizing a chirp-Z circuit, a programmable filter method of interference frequency rejection and a real-time method for setting programmable filter tap weights to optimize interference frequency rejection.

More specifically, a chirp-Z circuit and a local clock control a counter so that the counter stops at a critical number whenever the chirp-Z detects an interfering signal within the incoming signal. The critical number represents the interfering signal's frequency. Programmable filter tap values for that frequency are stored in a pre-set look-up table. The microprocessor reads the critical number, retrieves the tap values from the pre-set look-up table and quickly sends them to the programmable filter for real-time response. Thus, when the incoming signal passes through the programmable filter, set with new tap values, only the interfering signals pass through to an adder. The adder combines the interference signals with the incoming signal and outputs only the desired low level signal.

Therefore, this invention provides for a significant reduction of signal processing time as compared to prior devices because the tap values are not delayed by the many complex iterations of an algorithm and no prior information is required to optimize the tap values.

DESCRIPTION OF THE DRAWINGS

These and other features of the invention will be better understood in light of the Detailed Description of the Preferred Embodiment and the drawings wherein.

DETAILED DESCRIPTION OF THE PREFERRED EMBODIMENT

Figure 2:
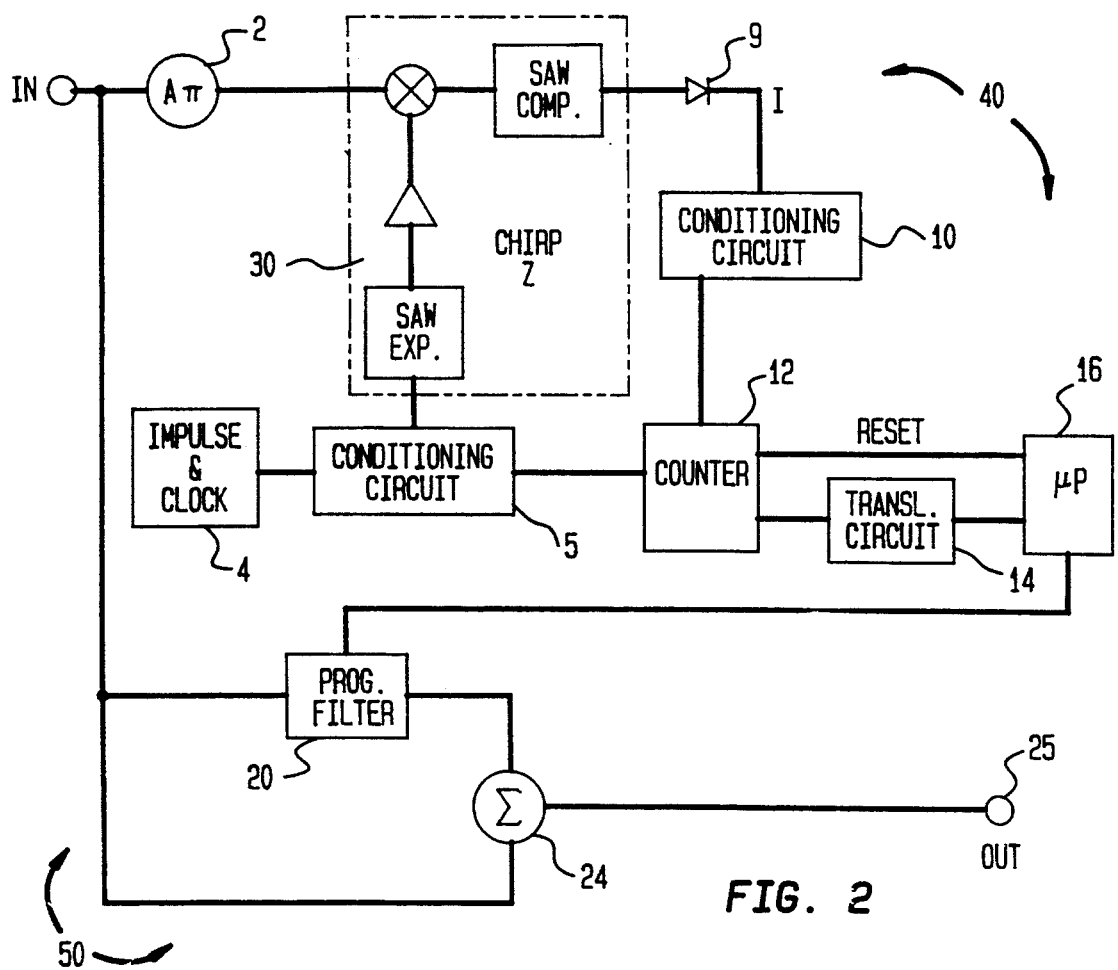
FIG. 2 is a block diagram illustration for preferred embodiment of this invention wherein the chirp-Z, clock, counter and microprocessor interface to control a programmable filter to output the desired low level signal.

Referring now to FIG. 2, the present invention utilizes circuitry 40 wherein a conventional chirp-Z signal analyzer 30 and an impulse/clock 4 interface with a counter 12 in order to output a critical number to a microprocessor 16 each time the chirp-Z 30 detects an interference signal. The microprocessor 16 utilizes each critical number to retrieve tap values pre-set in ROM 6 (pre-set look-up table). Each set of new tap values are then sent to the programmable filter 20 to optimize real-time interference rejection circuitry 50.

As is shown in circuitry 40, the incoming composite signal is attenuated by attenuator 2 to insure that only strong interference frequencies are detected by the chirp-Z circuitry 30. It is also shown that both the chirp-Z circuitry output and the local clock 4 impulses are fed to digital counter 12 through conditioning circuits 10 and 5, respectively, to adjust each signal to the proper timing and voltage level. The conditioning circuits utilized in the present invention are well known in the art and generally comprise a comparator, a one shot and a digital gate.

When the clock 4 pulse occurs, the chirp-Z circuitry 30 analyzes the attenuated incoming signal and searches for any strong undesirable interference frequencies. As described in SURFACE WAVE TRANSFORM ADAPTABLE PROCESSOR SYSTEM, pages 363–370 of the 1975 Ultrasonics Symposium Proceedings, IEEE Catalogue No. 75 CHO 994-4SU, Chirp-Z 30 analyzers are well known in the art and are used because chirp-Z analyzers can be swept-tuned to an operating frequency for very high resolution detection. In operation, chirp-2 analyzers function over a predetermined bandwidth to separate the incoming signal's frequency components into frequency segregated time domain signals. Generally, chirp-Z 30 analyzers are comprised of a SAW expander, SAW compressor and a multiplier which are all also well known in the art.

Simultaneous with the beginning of the chirp-Z analyzer's sweep through the spectrum, local clock 4 sends an impulse to start digital counter 12. When the chirp-Z analyzer 30 detects the presence of an interference signal it outputs a signal to diode 9 which detects the signal and in turn stops counter 12. The resulting count is a critical number that represents the actual frequency detected. This count is sent to the microprocessor 16 through a translator circuit 14 which regulates voltage level as necessary to interface with microprocessor 16. Microprocessor 16 reads this count, resets counter 12 via proper interface and retrieves tap values corresponding to that count from the pre-set look-up table within the microprocessor's ROM. These new tap values are sent to programmable filter 20 to optimize real-time interference rejection circuitry 50. Consequently, the programmable filter 20 passes only the detected interference frequencies to power combiner 24. Power combiner 24 then combines the filtered interference frequency signal with the incoming signal such that only the desired low level signal is output 25.

Figure 1:
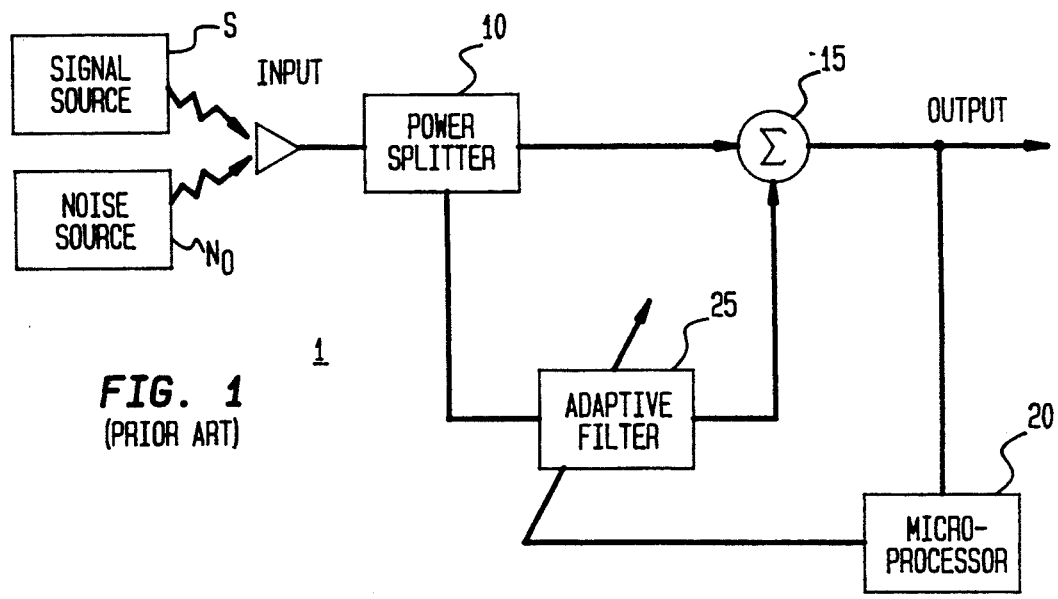
FIG. 1 is a block diagram of a prior art adaptive filter circuit.

This process eliminates the time consuming tap value computations required by aforementioned algorithm in prior art FIG. 1. In addition, prior knowledge of the desired signal is not required because this invention responds to the presence of interference frequencies in real time. Also, chirp-Z circuitry 30 and programmable filter 20 provide greater sensitivity and greater dynamic range than the prior art.

Although the present invention has been described in relation to a particular embodiment, many other variations and modifications and other uses will become apparent to those skilled in the art. Therefore, the present invention should not be construed to be limited by the specific disclosure herein, but only by the appended claims.

What we claim is:

1. An apparatus for real-time interference signal rejection, comprising:
    an input terminal;
    a chirp-z signal analyzer for deriving segregated time domain outputs of interference frequency components, said chirp-z signal analyzer electrically coupled to said input terminal;
    a programmable filter means for interference frequency rejection electrically coupled to said input terminal, said programmable filter means programmed to reject said interference frequencies according to a set of filter tap values;
    a digital counter electrically connected to said chirp-z signal analyzer through a first conditioning circuit;
    a clock electrically connected to said digital counter and said chirp-z signal analyzer through a second conditioning circuit, wherein said clock provides an impulse to start said digital counter and wherein said chirp-z analyzer stops said counter at a critical number which represents a detected interference frequency;
    processing means electrically connected to said digital counter for said programmable filter means, said processing means reading said critical number from said digital counter and retrieving a set of tap values that correspond to said critical number from a set of predetermined tap values, and said processing means outputing said predetermined tap values to reprogram said programmable filter means, and
    a power combining means combining the said programmable filter output and an input signal from said input terminal, whereby the real-time interference signals are rejected.

\* \* \* \* \*